United States Patent
Tognon et al.

(10) Patent No.: US 7,607,912 B2
(45) Date of Patent: Oct. 27, 2009

(54) MOULD HOLDING CROSS MEMBER FOR A MOULDING PRESS AND PRESS COMPRISING SAID CROSS MEMBER

(75) Inventors: Fabio Tognon, Colbertaldo di Vidor (IT); Davide Colla, Istrana (IT); Matteo Zoppas, Conegliano (IT)

(73) Assignee: S.I.P.A. Societa' Industrializzazione Progettazione E. Automatzione S.p.A. (IT)

( * ) Notice: Subject to any disclaimer, the term of this patent is extended or adjusted under 35 U.S.C. 154(b) by 167 days.

(21) Appl. No.: 11/597,396

(22) PCT Filed: May 25, 2005

(86) PCT No.: PCT/EP2005/052388

§ 371 (c)(1),
(2), (4) Date: Nov. 22, 2006

(87) PCT Pub. No.: WO2005/115717

PCT Pub. Date: Dec. 8, 2005

(65) Prior Publication Data

US 2007/0222124 A1    Sep. 27, 2007

(30) Foreign Application Priority Data

May 25, 2004   (IT)   .................. RM2004A0259

(51) Int. Cl.
*B29C 45/17* (2006.01)

(52) U.S. Cl. ................ 425/595; 425/451.6; 425/451.9; 425/593

(58) Field of Classification Search .............. 425/451.6, 425/451.9, 472, 593, 595; 100/214

See application file for complete search history.

(56) References Cited

U.S. PATENT DOCUMENTS

| 3,302,556 | A |   | 2/1967 | Durbin |
| 4,726,754 | A |   | 2/1988 | Breuker et al. |
| 5,593,711 | A | * | 1/1997 | Glaesener ............... 425/595 |
| 5,776,402 | A | * | 7/1998 | Glaesener ............... 425/589 |
| 6,027,329 | A |   | 2/2000 | Nazarian et al. |

(Continued)

FOREIGN PATENT DOCUMENTS

| DE | 19608135 A1 | 3/1996 |
| GB | 402561 | 12/1933 |

OTHER PUBLICATIONS

Patent Abstract of Japan, Publication 2002067113; Publication Date: Mar. 5, 2002 for the Applicant Mitsubishi Heavy Ind. Ltd.
Patent Abstract of Japan Publication No. 06155510; Publication Date: Jun. 3, 2004 for the Applicant Toshiba Corp.

*Primary Examiner*—James Mackey
(74) *Attorney, Agent, or Firm*—Knobbe, Martens, Olson & Bear LLP

(57) ABSTRACT

A mould holding cross member (9) according to the invention comprises a support base (91) a suitable to compress the mould (S) and more projecting, in the mould closing direction, than the ends (90) with which the cross member is connected to the moving columns (6) of the press on which it is fitted. The base (91) is connected to the rest of the cross member by a narrow portion (99) which extends in the central area of the base and between the projections of the hinging areas (7, 8) of the double toggle of the press on the press bed (2), and substantially not outside those projections. In this way the pressures are more uniformly distributed on the mould (S). The present invention also concerns a press fitted with a cross member (9) as defined above.

11 Claims, 4 Drawing Sheets

U.S. PATENT DOCUMENTS

| | | | |
|---|---|---|---|
| 6,171,097 B1 * | 1/2001 | Urbanek | 425/595 |
| 6,402,497 B1 * | 6/2002 | Banjyo et al. | 425/595 |
| 7,048,535 B2 * | 5/2006 | Takanohashi | 425/595 |
| 7,080,978 B2 * | 7/2006 | Glaesener | 425/595 |

* cited by examiner

MOULD HOLDING CROSS MEMBER FOR A MOULDING PRESS AND PRESS COMPRISING SAID CROSS MEMBER

FIELD OF THE INVENTION

The present invention concerns a mould holding cross member for a moulding press and press comprising said cross member.

PRIOR ART

For the injection moulding of plastic objects, in some cases presses are used that are equipped with two mould holding plates or cross members, for example one fixed with respect to the rest of the press, also called press bed, and the other mobile.

In particular, in the case of rectangular moulds or moulds with another markedly elongated shape—for example with an aspect ratio of the mould equal to two, three or four times—presses have been developed with mould closing systems which on both cross members apply the closing and compression forces in at least two areas, distinct from each other, of the cross members themselves: for example, in the press of a known type shown schematically in FIG. 1 the closing and opening movements of the upper cross member 1 and on the press bed 2, respectively mobile and fixed with respect to the frame of the press itself, are given by the double toggle mechanism 3, which in turn is activated by a hydraulic cylinder 4; on one side the double toggle mechanism 3 is fixed directly onto the press bed 2, on the other it activates the lower mobile cross member 5, which in turn moves the upper cross member 1 through the four moving columns 6.

The moving columns 6 apply the mould compressing forces on the two ends of the upper cross member 1, while the levers of the double toggle mechanism 3 apply the above-mentioned compression forces in two distinct areas of the press bed 2. In the example of a press of a known type in FIG. 1 the upper cross member 1 is realised as a set of steel plates welded together so as to form a beam with a behaviour under bending stress fairly similar, at least in a first approximation, to that of a simple beam with an approximately uniform module of resistance to bending stress along the whole length of the cross member itself.

Although such a solution ensures a more uniform pressure distribution, on the two halves of the mould, than that obtained applying the mould closing force and tonnage on only one point of the press bed, even with double toggle presses of a known type, particularly in the case of moulds with a markedly elongated shape as described above, the mould closing pressure distributions are too uneven; in particular the two pairs of columns 6 tend to curve the upper cross member 1 upwards—with reference to FIG. 1—concentrating the closing pressures of the half moulds at their ends and decreasing them in the centre of the mould; this can generally cause defects in the pieces moulded in the moulding cavities in the centre of the mould; relative slipping between the two half moulds and marked burs on the joining lines between the half moulds.

The fact that often the press bed 2 cannot be particularly massive and rigid, for reasons of bulk and because it has to house suitable devices inside it—to the extent that it is more flexible and deformable than the upper cross member 1—means that also the concentrations of stress on the bed 2 at the hinge points of the levers of the double toggle produce important and generally undesired lacks of uniformity on the distribution of the closing pressures on the half-mould fixed to the press bed 2.

FIG. 2 schematically shows a diagram of the pressure distribution along a mould S fitted on a press equipped with the cross member 1 in FIG. 1: the pressure trend is indicatively concave, with maximum pressure values concentrated at the ends of the mould and minimum values in the centre.

An aim of the present invention is to realise an improved distribution of the closing pressures of a mould, and in particular, more uniform, than the distribution of the closing pressures obtained with the presses and with the moulding methods of a known type mentioned above.

SUMMARY OF THE INVENTION

This aim is achieved, in a first aspect of the present invention, with a mould holding cross member suitable to cooperate with a press bed of a moulding press for closing and compressing together two half moulds, by applying two actuators in two first actuator pushing areas of the press bed, according to a predetermined mould closing direction, where said cross member comprises:

at least two cross member actuating ends, each of which comprises a second actuator pushing area in which at least one suitable cross member actuator can be connected and apply a mould closing force on the cross member, where the projections of the first actuator pushing areas are between the at least two second actuator pushing areas;

a support base located in a more protruding position, according to the mould closing direction, with respect to the cross member actuating ends and suitable to transfer to the mould the compression force applied on the cross member actuating ends;

a narrow portion interposed, according to the mould closing direction, between the at least two cross member actuating ends and the support base, and suitable to transfer to the support base the compression force applied on the at least two cross member actuating ends;

where each cross member actuating end protrudes, according to a direction normal to the mould closing direction, beyond the narrow portion and the narrow portion extends, between and substantially not beyond the projections of the first-actuator pushing areas.

In a second aspect of the present invention this aim is achieved with a moulding press characterised in that it comprises:

a mould holding cross member as defined above;

a press bed, where the mould holding cross member and the press bed are mobile with respect to each other and each suitable to fix on itself at least a mould part and to close together said mould;

means for actuating the press bed suitable to apply compression forces in at least two first actuator pushing areas of said press bed substantially distinct from each other, so as to close the mould between the press bed and the mould holding cross member.

The advantages that may be obtained with the present invention will be more apparent, to the person skilled in the art, by the following detailed description of a particular embodiment with a non limiting character, with reference to the following figures.

Figure 3:
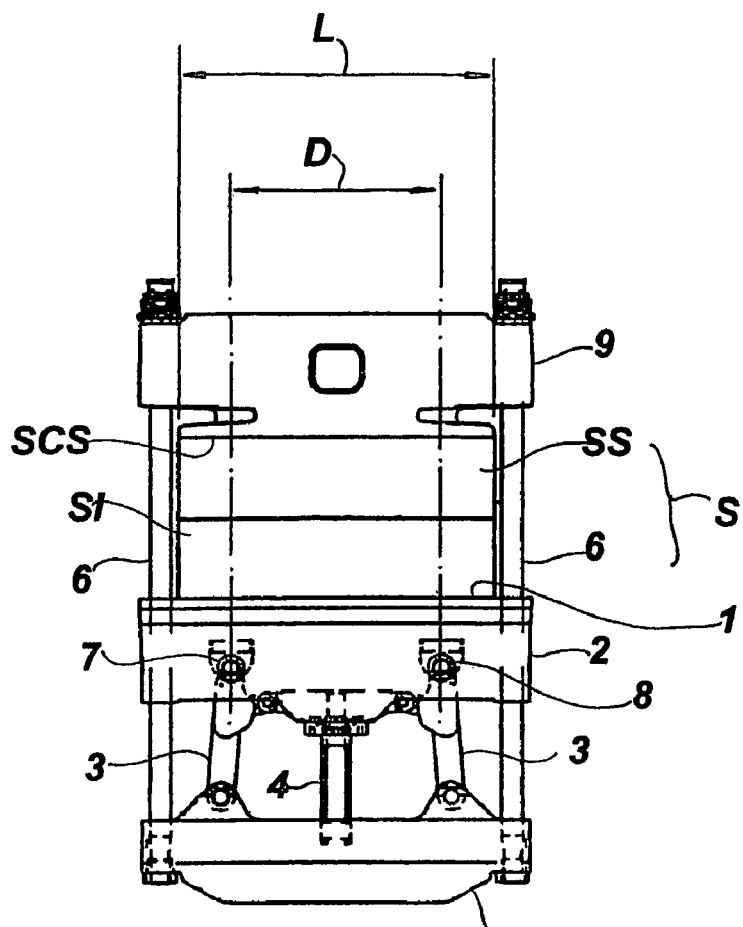
FIG. 3 schematically shows a front view of a first embodiment of a cross member and of a press according to the present invention.
Figure 14:
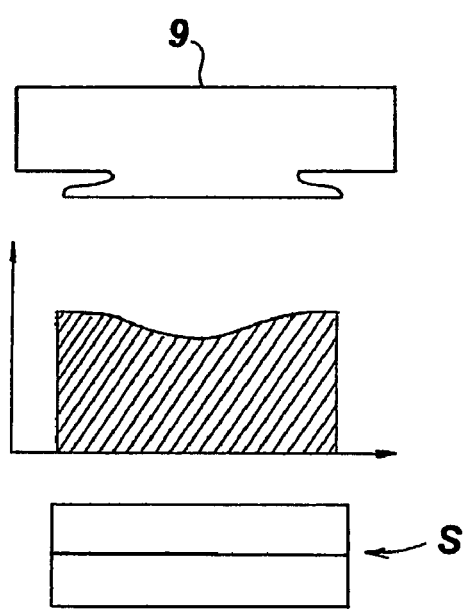
Figure 4:
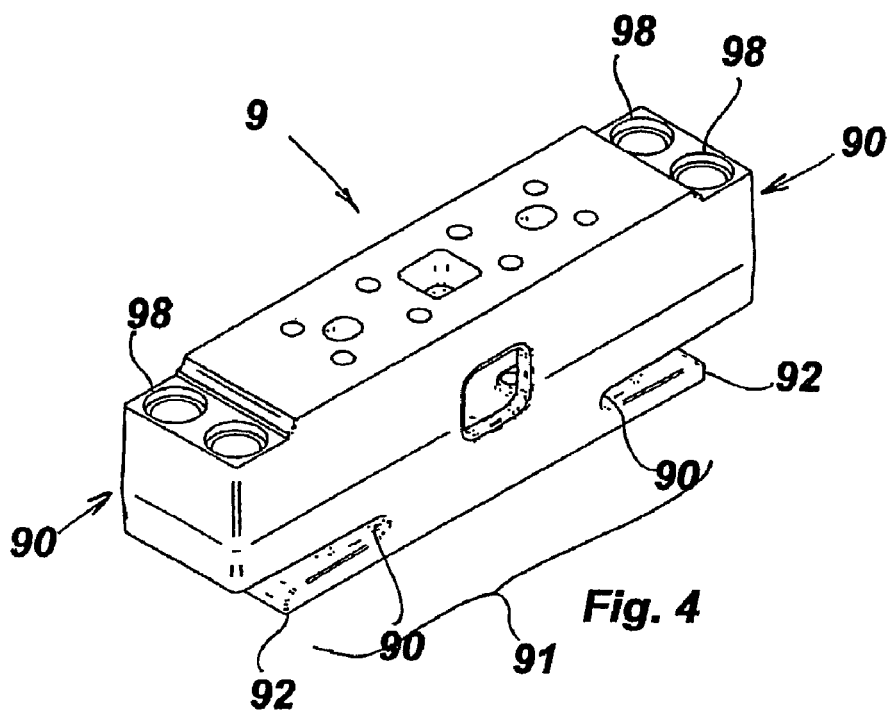
FIG. 4 schematically shows a perspective view of the upper mould holding cross member of the press in FIG. 3.
Figure 10:
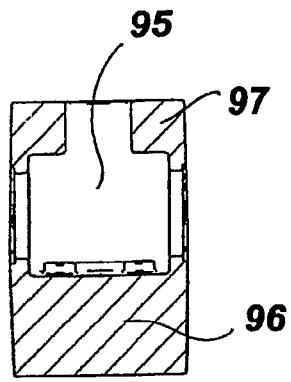
Figure 11:
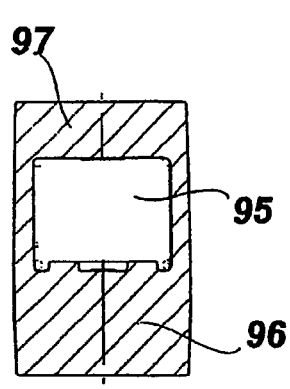
Figure 12:
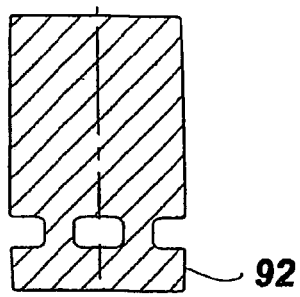
Figure 13:
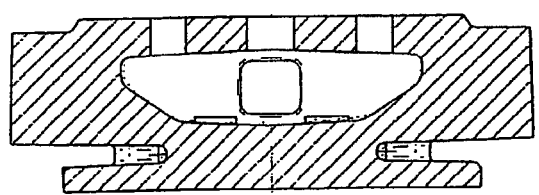
Figure 9:
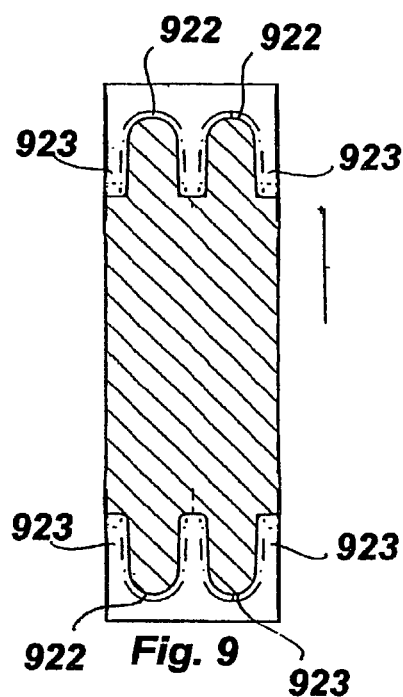
Figure 8:
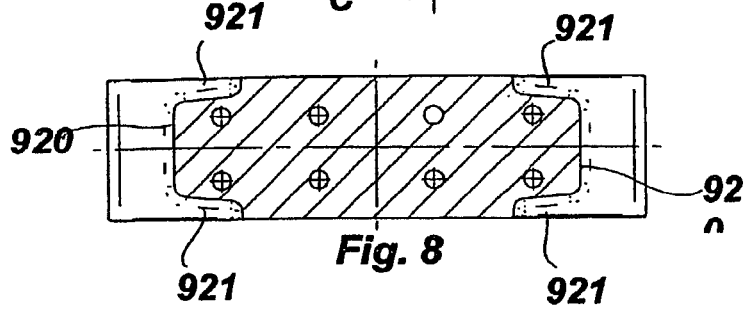
Figure 7:
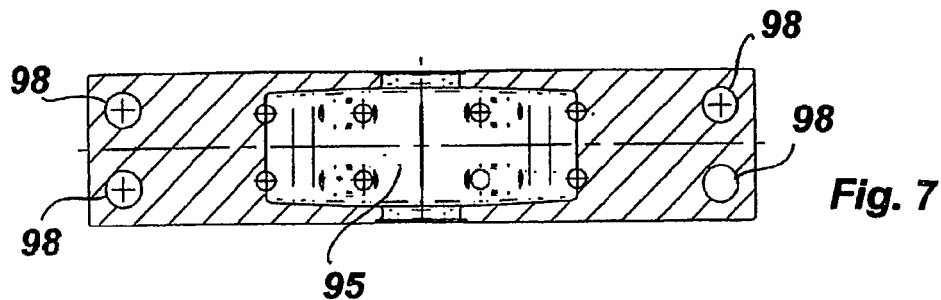

the FIGS. 7 and 8 schematically show the views of the section respectively according to the planes F-F and E-E of the cross member in FIG. 4;

FIG. 9 schematically shows a section view of the connection area of the transverse wings of the support base to the rest of the base itself according to a second embodiment of an upper mould holding cross member according to the present invention;

FIGS. 10-11 schematically show the views of the section respectively according to the planes B-B and C-C of the cross member in FIG. 4;

FIG. 12 schematically shows the view of the section according to the plane D-D of the cross member in FIG. 9;

FIG. 13 schematically shows a section view of the cross member in FIG. 9 according to a section plane longitudinal to the cross member itself and perpendicular to the section planes of FIGS. 9 and 12;

FIG. 14 schematically shows the pressure trend on a mould fitted on the press in FIG. 3.

DETAILED DESCRIPTION

The FIGS. 3-8 concern a mould holding cross member and a press according to a first embodiment of the present invention.

Figure 1:
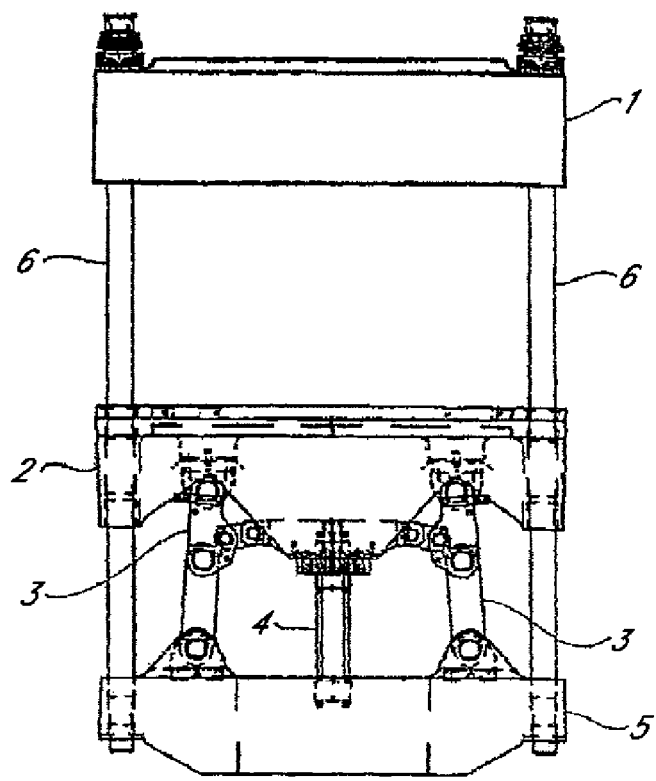
FIG. 1 schematically shows a front view of a press of a known type.

This press comprises a press bed 2, a double toggle closing mechanism 3, a hydraulic cylinder 4 which activates the mechanism 3, a lower mobile cross member 5 and two pairs of moving columns 6, in the present example, but not necessarily, already known and similar to the corresponding elements 2, 3, 4-6 of the press of a known type in FIG. 1; similarly to the press in FIG. 1, in the press in FIG. 3 the double toggle system applies the closing force of the two half moulds SS and SI on the press bed 2, fixed with respect to the frame of the press, directly through the two hinging points 7, 8 of two of its levers on the press bed 2, and on the upper mould holding cross member 9, subsequently also called simply "upper cross member" or "mould holding cross member", mobile with respect to the frame of the press, through the lower mobile cross member 5 and the double pair of moving columns 6; the lower half mould SI is fixed onto the press bed 2 and the upper half mould SS onto the upper mould holding cross member 9.

In the present particular embodiment, the mould S has an elongated shape, with an aspect ratio of about 3-4 times; the two hinging points 7, 8 of the double toggle system 3 on the press bed 2 give rise to two areas of concentration of substantially distinct forces, separated from each other by a distance D in the direction longitudinal to the mould S; in other embodiments, not shown, suitable means for actuating the press bed even different from a double toggle mechanism—for example another mechanism with levers or hydraulic cylinders that connect directly to the mould holding bed, or a system of screws or jacks, or other means for actuating the press bed—still apply pushes on the press bed, in at least two areas called below "first actuator pushing areas 7, 8" substantially distinct from each other.

In the case of other embodiments, in which the means for actuating the press bed apply pushes on the press bed in three or more actuator pushing areas substantially distinct from one another, the teachings of the present description are to be understood as referring to the pair of actuator pushing areas farthest from each other.

In the present preferred embodiment, the mould holding cross member (FIGS. 4-8) comprises:

two ends 90, called below also "cross member actuating ends 90", in each of which are made through holes 98 (or, in other embodiments not shown, with suitable cross member actuator pushing areas called, in the present description, "second actuator pushing areas") to house the moving columns 6, and a support base 91 (FIG. 4) situated in an intermediate position between the two ends 90 and suitable to press on the mould S, or at any rate to transmit to the mould S the mould closing force and the compression force applied by the columns 6 on the upper cross member 9.

According to the present invention, the support base 91 protrudes, depending on the mould closing direction, with respect to the cross member actuating ends 90.

The cross member 9 also comprises a "neck" or narrow portion 99 (FIG. 4-6) interposed, depending on the mould closing direction DS (FIG. 4), between the two cross member actuating ends 90 and the support base 91; the narrow portion 99 is suitable to transfer to the base 91 the compression force applied by the columns 6 on the ends 90 of the cross member.

Each of the ends protrudes, in the direction of the length of the cross member, beyond the limits of the narrow portion 99, which extends on the distance between the projection lines—called below, for brevity's sake, also "projections"—of the two hinging areas 7, 8 depending on the mould closing direction DS, and not beyond said projections.

Figure 2:
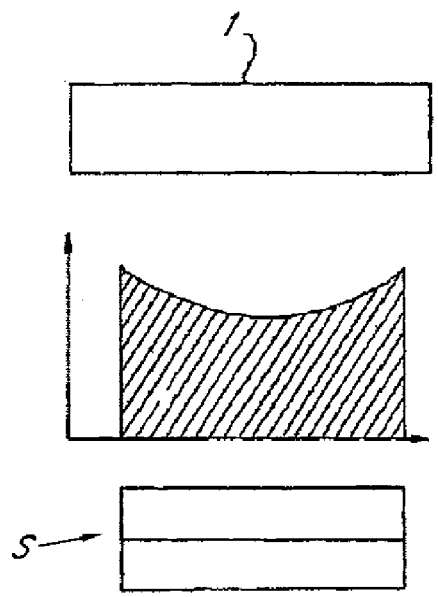
FIG. 2 schematically shows the pressure trend on a mould fitted on the press in FIG. 1.

Unlike the cross member 1 of a known type, such a structure avoids the ends of the cross member, stressed by the pull of the moving columns 6, rotating—one in a clockwise, the other in an anti-clockwise direction—since they rest as on two fulcrums on the edges of the mould and, instead of the parabolic or parabolic-like pressure distribution in FIG. 2, it is possible to obtain pressure distributions on the mould similar to that in FIG. 14, with a non monotonous trend and with a single central concavity. This distribution is presented as a curve with an approximately concave-convex shape with two fairly flat maximum areas corresponding to the projections of the hinging areas 7, 8 of the levers of the double toggle on the press bed 2 and a minimum area in the centre: in the pressure distribution in FIG. 14 the differences in pressure between the two maximum points and the minimum point are however less than the differences in the diagram in FIG. 1 and the pressures in the various areas of the mould are generally more uniform.

Preferably the support base 91 extends, in horizontal projection, at least as far as to reach the projections of the hinging areas 7, 8 and, in the preferred embodiments in FIGS. 3-13, the support base 91 extends, in horizontal projection, beyond and outside the projections of the areas 7, 8 with two side wings 92 which are prolonged like two projecting shelves, longitudinally with respect to the cross member 9 itself and transversely with respect to the moulding direction DS.

The two side wings 92 are substantially less rigid and more yielding with respect to bending—depending on the moulding direction DS due to the forces exchanged between the mould S and the cross member 9—of the central part 93 (FIGS. 4-6) of the base 91 which extends, in horizontal projection, between the projections of the hinging areas 7, 8; in the present description, the part 93 of the base 91 is also called "rigid pressing portion 93".

The connecting areas between each wing 92 and the more massive central part of the base 91 may have different shapes: in the embodiment in FIG. 8 these connecting areas present a massive central protrusion 920 and two discharged side areas 921; in the embodiment in FIG. 9 these connecting areas have two ribs 922 and two discharged side areas 923; however, other shapes are also possible.

In the present embodiment the side wings 92, though applying a smaller fraction of the closing force on the mould S, contribute to make the pressure distribution more uniform between the cross member 9 and the mould S, avoiding sudden interruption in the pressure distribution at the ends of the mould S, and they also have the function of holding and blocking the mould.

Figure 5:
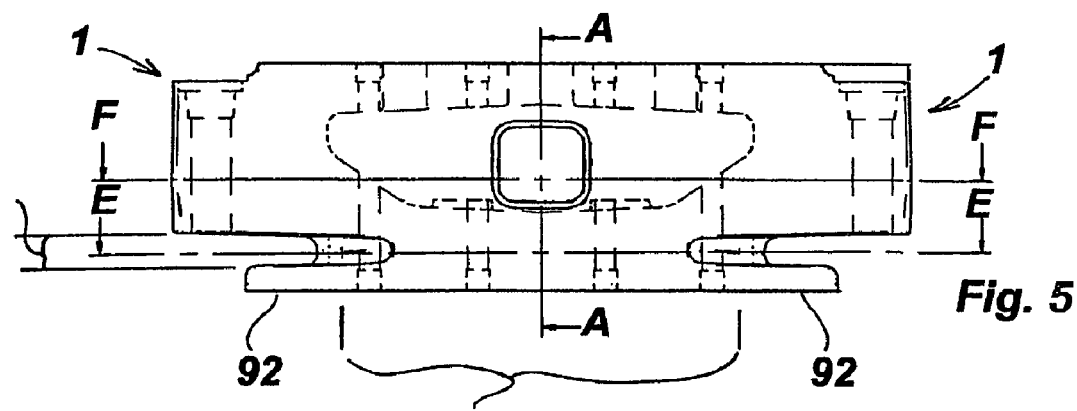
FIG. 5 schematically shows a side view of the cross member in FIG. 4.
Figure 6:
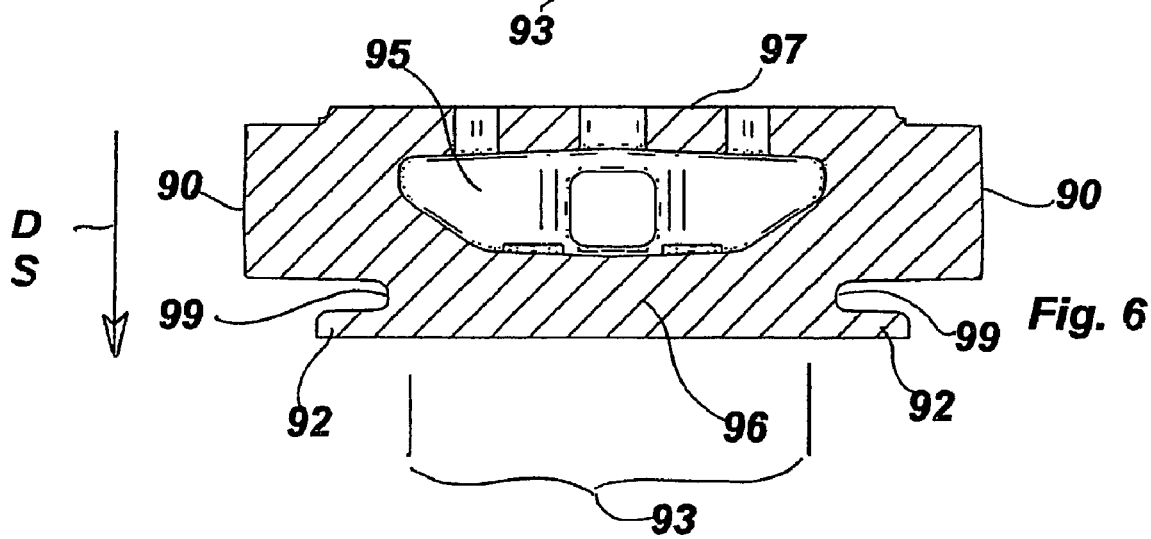
FIG. 6 schematically shows the view of the section according to a median longitudinal plane of the cross member in FIG. 4.

With reference to the FIGS. 5, 6 the upper cross member 9 presents an internal elongated cavity 95, oriented longitudinally with respect to the cross member 9 and which indicatively divides the body of the cross member into a lower trunk 96 and an upper trunk 97, situated longitudinally with respect to the cross member 9 itself and which are elongated between its two ends 90; the central part of the lower trunk 96 realises the above-mentioned rigid pressing portion 93.

In the present embodiment the cross sections according to the section planes B-B, SC and planes parallel to them—that is section planes parallel to the mould closing direction and across the mould itself—have a substantially rectangular shape, as shown in FIGS. 10 and 11.

During tonnage and closing of the mould S the lower trunk 96 is indicatively stressed, mainly by compression, while the upper trunk 97 is subjected mainly to tensile stress, increasing the bending stiffness of the cross member.

Preferably, but not necessarily, the cross member 9 is made of iron casting; in other embodiments, not shown, the cross member may be made of welded steel plates.

The greatest flexural strength of the lower trunk 96 and in particular of the rigid pressing portion 93 is obtained, in the present embodiment, by realising a length of massive beam with a substantially rectangular full section; however, in other embodiments—not shown—it is possible to realise the rigid pressing portion 93 with a lighter structure, for example a ribbed one.

Preferably at least a length of the rigid pressing portion 93 and of the lower trunk 96 have a substantially uniform module of bending resistance in a direction longitudinal to the cross member 9.

Preferably the press and the mould holding cross member 9 described so far are used for fitting a mould S of which the substantially flat interface surfaces SCS and SCI (FIG. 3), on which respectively the cross member 9 and the press bed 2 apply the mould closing forces, are extended, in horizontal projection, at least as far as the hinging points 7, 8 of the levers of the double toggle 3 on the press bed 2, that is the length L of the mould (FIG. 3)—or at least of the press interface surfaces SCS—and SCI—is substantially not smaller than the centre distance D between the two hinging areas; even more preferably, the mould S extends, in horizontal projection, beyond the hinging points 7, 8, that is the length L of the mould is greater than the centre distance D; these ratios between the dimensions of the moulds, of the upper cross member 9 and of the hinging points of the double toggle allow more uniform pressure distributions to be obtained on the mould.

The moulding cavity or the plurality of moulding cavities in the mould are located, preferably but not necessarily, in the horizontal part of the mould between the two hinging points 7, 8 or, more generally, in the horizontal part of the mould between the actuator pushing areas 7, 8 and/or on the rigid pressing portion 93 of the cross member 9.

According to the above teachings, with the upper cross member 9, the press and the oblong mould with 20 moulding cavities arranged in a row, shown in FIG. 3 it was possible to obtain a more uniform distribution of the mould closing pressure than that obtained when fitting the same mould on the press of a known type in FIG. 1: with the press in FIG. 3 it is possible to obtain RP ratios between the closing pressure of the first moulding cavity (the most external) and the closing pressure of the tenth moulding cavity (closer to the centre of the horizontal part of the mould) of about two or three times, while with the press in FIG. 1 it is possible to obtain RP ratios of about five or six times. More generally, in a cross member 9 according to the present invention it is possible to obtain RP ratios of about half the RP ratios of a cross member of a known type such as the one in FIG. 1. Likewise with respect to the known cross member 1 in FIG. 1, with a cross member 9 according to the invention it was possible to halve the cross member planarity errors during moulding.

Another result obtained is the improvement of the mould closing seal during the PET injection phase, with consequent reduction of moulding burrs. The embodiment described above is susceptible to numerous modifications and variations without departing from the sphere of the present invention: for example the structure according to the invention may be adapted to realise mould holding cross members for presses of a different type 7 such as cross members activated not by moving columns 6 but by other means of movement, for example pushed by hydraulic cylinders or by levers; in this case the through holes for fixing the columns 98 are to be understood more generally as second pushing areas of the cross member actuators 98. A mould holding cross member according to the invention can also be fixed with respect to the press frame, and not necessarily mobile.

It is understood that all modifications and variations falling within the meaning and equivalence of the claims are included therein.

The invention claimed is:

1. Moulding press comprising:
   a cross member, whereby said cross member comprises at least two cross member actuating ends, each of which comprises a second actuator pushing area in which at least one cross member actuator can be connected so as to apply a mould closing force on the cross member, the cross member having a support base and a transverse width between the actuating ends;
   a press bed, the cross member and the press bed being capable of moving with respect to each other and able to close together a mould positioned therebetween;
   first actuators applying, during use, compression forces in at least two first actuator pushing areas of said press bed substantially distinct from each other, so as to close the mould between the press bed and the cross member, projections of said at least two first actuator pushing areas extending substantially parallel to the direction of the closing of the mould;
   the support base having a transverse width, the support base configured in a more protruding position, according to the mould closing direction, with respect to the cross member actuating ends and suitable to transfer to the mould a compression force applied on the cross member actuating ends; and,
   a portion interposed between the cross member actuating ends and the support base, the portion being a relatively narrow portion having a transverse width less than the transverse width of the cross member and the transverse width of the support base and configured to transfer to the support base the compression force applied on the at least two cross member actuating ends located on the cross member, wherein each cross member actuating end protrudes, according to a direction normal to the mould closing direction, beyond the narrow portion wherein the projections of the first actuator pushing areas are between the at least two second actuator pushing areas, and the relatively narrow portion extends between and substantially not beyond the projections of the first actuator pushing areas.

2. Moulding press according to claim 1, wherein the support base extends, in horizontal projection, at least as far as the two first actuator pushing areas of the press bed.

3. Moulding press according to claim 2, wherein the support base extends, in transverse width, beyond the two first two actuator pushing areas of the press bed.

4. Moulding press according to claim 3, wherein the portion interposed between the cross member actuating ends and the support base is substantially more rigid, with respect to bending due to the pressure forces exchanged between the mould and the cross member, than the mould support base.

5. Moulding press according to claim 4, wherein the support base comprises one or more extensions elongated towards the two actuating ends of the cross member.

6. Moulding press according to claim 5, comprising further an internal central cavity within the cross member, and at least one upper wall which closes the internal central cavity on its side opposite the support base so as to connect the two cross member actuating ends in such a way as to increase the bending stiffness of the cross member.

7. Moulding press according to claim 6, wherein the support base comprises a part substantially in the shape of a beam positioned longitudinally with respect to the cross member itself and having a module of resistance to the bending generated by the pressures exchanged between the mould and the cross member that is substantially constant along a direction longitudinal to the cross member itself.

8. Moulding press according to claim 7, wherein the support base extends, in a transverse width, at least as far as the projections of the at least two first actuator pushing areas.

9. Moulding press according to claim 8, the support base extends, in a transverse width, beyond the projections of the two first actuator pushing areas.

10. Moulding press according to claim 9, further comprising means for actuating the press bed, wherein the means for actuating the press bed comprise one or more of the following components: a double toggle mould closing mechanism and at least one hydraulic cylinder suitable to apply the mould closing and compression force on the press bed.

11. Moulding press according to claim 10, wherein the support base comprises at least two press interface surfaces on which respectively the cross member and the press bed can apply the mould closing forces, where said press interface surfaces extend on the horizontal portion of the press bed both between the at least two first actuator pushing areas and beyond the at least two first actuator pushing areas.

* * * * *

UNITED STATES PATENT AND TRADEMARK OFFICE
CERTIFICATE OF CORRECTION

| | | |
|---|---|---|
| PATENT NO. | : 7,607,912 B2 | Page 1 of 1 |
| APPLICATION NO. | : 11/597396 | |
| DATED | : October 27, 2009 | |
| INVENTOR(S) | : Tognon et al. | |

It is certified that error appears in the above-identified patent and that said Letters Patent is hereby corrected as shown below:

On the Title Page (Item 73) Assignee, line 2, change "S.p.A" to -- S.P.A. --.

On the Title Page (Item 57) Abstract, line 3, after "(91)" delete "a".

In column 2, line 2, change "half-mould" to -- half mould --.

In column 2, line 44, change "first-actuator" to -- first actuator --.

In column 3, line 13, before "FIGS." delete "the".

In column 4, line 26, change "(FIG." to -- (FIGS. --.

In column 5, line 15, change "interruption" to -- interruptions --.

In column 5, line 27, change "SC" to -- C-C --.

In column 6, line 30, change "type 7 such" to -- type-such --.

In column 7, line 20, in Claim 3, after "first" delete "two".

Signed and Sealed this

Sixth Day of July, 2010

David J. Kappos
*Director of the United States Patent and Trademark Office*